Oct. 13, 1959    N. L. CULL ET AL    2,908,721
MODIFIED CARBONYLATION REACTION
Filed Jan. 23, 1957
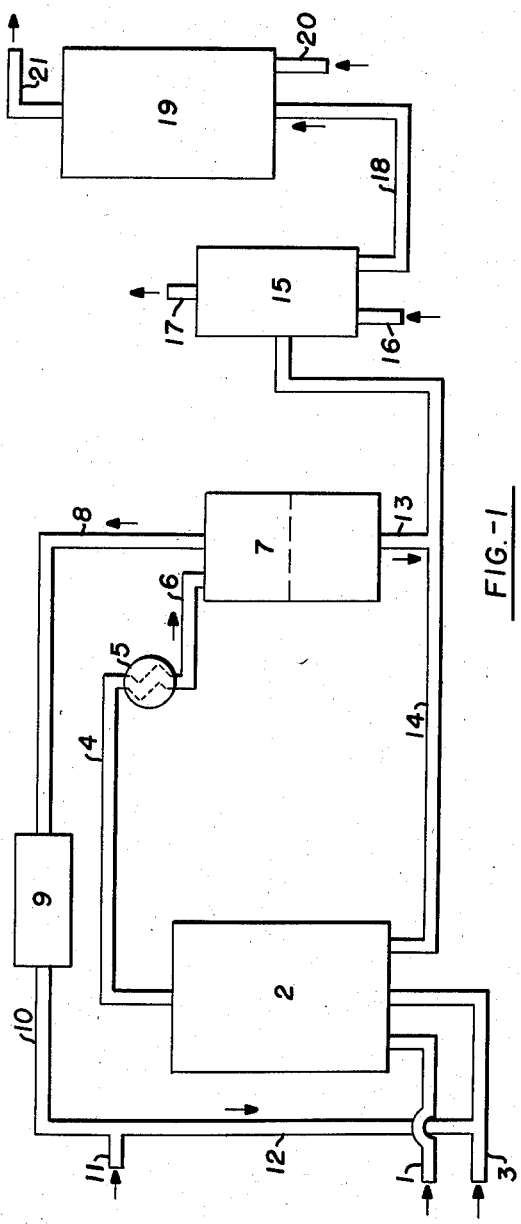
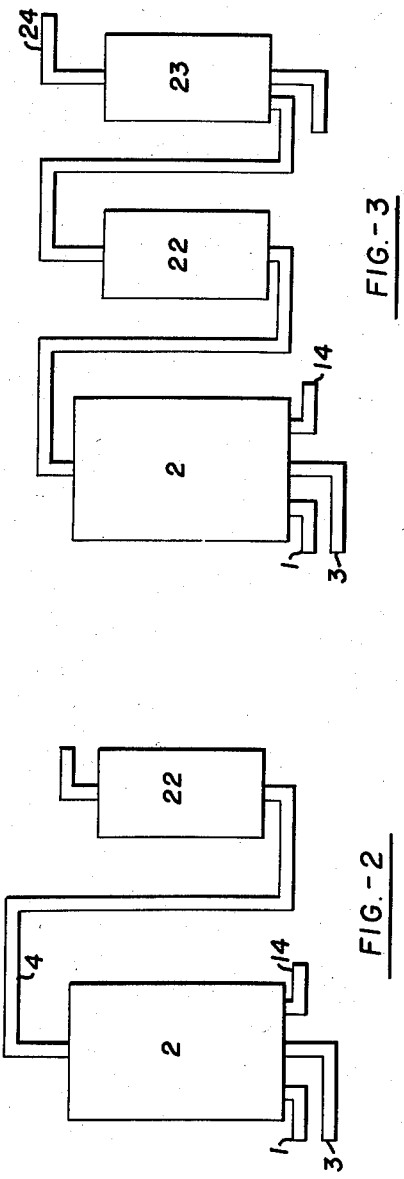
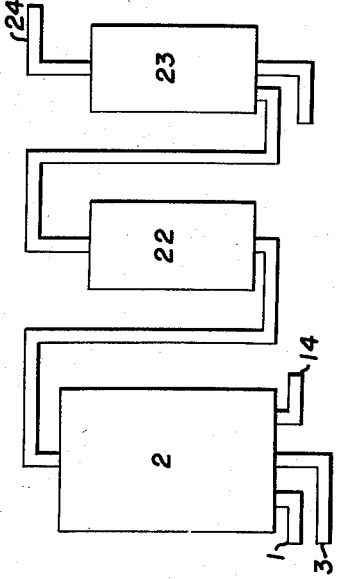
Neville Leverne Cull
Clyde Lee Aldridge    Inventors
By *Seymour Stahl* Attorney

United States Patent Office

2,908,721
Patented Oct. 13, 1959

2,908,721

MODIFIED CARBONYLATION REACTION

Neville Leverne Cull and Clyde Lee Aldridge, Baker, La., assignors to Esso Research and Engineering Company, a corporation of Delaware Application January 23, 1957, Serial No. 635,889

5 Claims. (Cl. 260—638)

This invention relates to a modification of the oxo or carbonylation process whereby the yield of high molecular weight alcohols having 2–3 more carbon atoms than twice the number in the olefin feed and other valuable high molecular weight products is materially increased and the yield of less desirable bottoms is substantially decreased. More particularly, this invention relates to the oxo or carbonylation process employing a silica-alumina solid modifier to effect a desired increase in dimer alcohol yield. The particular manipulative steps of this process will be explained in detail hereinafter.

It is well known in the art that oxygenated organic compounds may be synthesized from organic compounds containing olefinic linkages by a reaction with carbon monoxide and hydrogen in the presence of a catlyst containing materials of group VIII in the periodic chart, such as cobalt, iron, rhodium and the like, in an essentially three-stage process. In the first stage, the olefinic material catalyst and proper proportions of CO and $H_2$ are reacted to give a product consisting predominantly of aldehydes which are converted by hydrogenation to alcohols containing one more carbon atom than the reacted olefin. Secondary products from the above main carbonylation reaction include both dimer alcohols comprising two more carbon atoms than twice the number of carbon atoms in the olefinic feed or containing three more carbon atoms than twice the number of carbon atoms in the olefinic feed. The latter type may be termed more specifically ether or alkoxy alcohols. For example, oxonation of a $C_7$ olefin will after hydrogenation yield $C_8$ alcohols, $C_{16}$ alcohols, $C_{17}$ ether alcohols having an ether linkage near the center of the molecule and higher molecular "bottoms." These dimer alcohols ($C_{16}$ and $C_{17}$) are, in many cases, extremely desirable products and attempts to increase the yields of these compounds have been made with varying degrees of success. Conversely, extremely high molecular weight "bottoms," i.e. the fraction boiling substantially above the so-called dimer oxygenated compounds are undesirable and have generally less utility than the other products.

The oxygenated organic mixture from the first stage which generally contains a form of the catalyst dissolved therein is treated in a second stage to cause removal of soluble metal compounds from the organic material in a catalyst removal zone. The catalyst-free material is then hydrogenated to the corresponding alcohols or oxidized to the corresponding acids if the aldehydes are not the desired end products. Since today's market finds more utility for alcohols than aldehydes, as for example, intermediates in the preparation of plasticizers, detergents, and the like, most commercial oxo operations include the hydrogenation step. The final alcohol product is then fractionated in a known manner to separate the various fractions noted above.

Amenable to the reaction are long and short chained olefinic compounds, depending on the type alcohol desired. Not only olefins, but most organic compounds, possessing at least one non-aromatic carbon-carbon double bond may be reacted by this method. Thus, straight and branched chain olefins and diolefins, such as propylene, butylene, pentene, hexene, heptene, butadiene, pentadiene, styrene, as well as high molecular weight olefins, such as in the range of $C_8$–$C_{20}$, will find application in the oxo synthesis. It is particularly desirable, for example, to produce $C_{20}$ or $C_{21}$ alcohols from a $C_9$ olefin feed since the feed required in the conventional oxonation of olefins to produce a $C_{20}$ alcohol, i.e. a $C_{19}$ olefin, is less available and more expensive in comparison to the readily available lower molecular weight olefins, i.e. $C_3$–$C_{10}$. Moreover, oxonation of these higher molecular weight olefins requires high temperatures and pressures as well as additional catalyst. Also with U.O.P. $C_{15+}$ olefins oxonation becomes more difficult because of larger amounts of type IV and V olefinic constituents and very low conversions result.

The catalyst in the first stage is generally added in the form of a salt of the catalytically active metal with a high molecular weight fatty acid, such as stearic, oleic, palmitic, naphthenic, etc. acids. Thus, suitable catalysts are, for example, cobalt oleate, naphthenate, stearate, and the like. These salts are soluble in the liquid olefin feed and may be supplied to the first stage as hydrocarbon solution or dissolved in the olefin feed. Beside the oil-soluble catalyst, water-soluble and insoluble forms of cobalt have been employed with varying degrees of success. The latter type catalysts include cobalt acetate, cobalt formate, cobalt oxylate, cobalt oxide, metallic cobalt, and the like.

The synthesis gas mixture fed to the first stage may consist of almost any ratio of hydrogen to carbon monoxide, i.e. from .5–4:1, preferably in equal volumes. The conditions for reacting olefins with the synthesis gas vary in accordance with the nature of the olefin feed. However, the reaction is generally conducted at pressures in the range of about 1000 to 5000 p.s.i.g. and the temperatures in the range of about 100° to 450° F. It is to be understood that the pressures and temperatures may go beyond the ranges set forth herein and that the specific ranges noted are merely exemplary of the preferred conditions. Ratio of synthesis gas to olefin feed may also vary widely and, in general, may be maintained between 2500 to 15,000 cubic feet of $H_2$+$CO$ per barrel of olefin feed employed.

A typical product distribution from a conventional $C_7$ olefin oxo process comprises about 64 wt. percent $C_8$ alcohol, 3% combined $C_{16}$ and $C_{17}$ (dimer) alcohols, 14 wt. percent bottoms and the rest being made up of unreacted hydrocarbons and oxygenated products intermediate the $C_8$ and $C_{16}$ compounds. It is a primary purpose of this invention to increase the dimer alcohol yield. A further object is to concomitantly reduce undesirable bottoms yield in the oxonation process.

To effect the desired results in either a continuous or a batch-type operation several embodiments may be employed, all of which fall within the scope of the invention. This invention comprises contacting the reaction mixture with a silica-alumina modifier. One embodiment contemplates packing the oxo reactor with activated silica-alumina so that contact is made during the reaction. The packing may comprise from about 10–100% of the reactor. This embodiment is operative with or without recycling oxygenated product as is done in many commercial operations. Another embodiment entails passing oxo product, i.e. oxo reactor effluent, through a column or any zone containing silica-alumina and recycling the contacted product to the oxo reactor. A third embodiment comprises contacting reactor effluent with silica-alumina and then passing the contacted product to a secondary oxo reactor. Conditions within said secondary oxo reactor are preferably within the range of conditions set forth for the primary reactor.

Instead of employing a packed column other methods of contacting can be employed, such as slurrying the silica-alumina in olefin feed and passing the slurry into the reactor or slurrying the product effluent with silica-alumina prior to reoxonation. When a slurrying technique is used it will of course be necessary to separate the liquid from the solid which may be done by any conventional means such as filtering, centrifuging and the like.

The silica-alumina should be free from metallic coating or impregnation to expose as much surface as possible.

The present invention and its application will be best understood from a more detailed description hereinafter wherein reference will be made to the accompanying drawing which depicts simplified schematic representations of systems suitable for carrying out several preferred embodiments of this invention. Figure 1 illustrates one embodiment of the invention wherein the oxo reactor is packed with solid contacting material. Figure 2 shows the use of a silica-alumina packed column through which the oxo reactor effluent passes. Figure 3 shows the use of an additional oxo reactor which may be employed in conjunction with the packed tower in Figure 2.

Referring now to Figure 1, an olefinic hydrocarbon feed such as a $C_7$ olefin containing the desired amount of catalyst, e.g. .05–2 wt. percent cobalt compound, is passed through line 1 to primary oxo reactor 2. Concurrently, a synthesis gas mixture comprising carbon monoxide and hydrogen, preferably in equal ratios, is fed into reactor via line 3. Temperatures and pressures are preferably maintained about 350° F. and 3500 p.s.i.g. Tower 2 is packed to the desired extent with silica-alumina which may comprise 10 to 90 wt. percent silica and 90 to 10 wt. percent alumina. Preferably a good grade cracking catalyst comprising 13% alumina and 87% silica which has been activated at 1000° F. for about 12 hours is employed.

The reactor effluent comprising liquid oxygenated reaction products containing catalyst in solution as well as unreacted synthesis gases is continuously withdrawn overhead via line 4 and passed through cooler 5 via line 6 to a high pressure separator 7 from which unreacted gases are withdrawn overhead via line 8 and passed through scrubber 9 where entrained liquid is separated. The scrubber may be omitted if desired. Synthesis gas may be purged from the system via lines 10 and 11, for convenience the valves are not shown, or alternatively recycled to the reactor via lines 12 and 3. Liquid oxygenated product is recovered from separator 7 via line 13 and any portion thereof may be recycled to the primary oxo reactor via line 14 for cooling the exothermic reaction and for additional conversion of unreacted olefin. The product is passed through line 13 to a decobalter zone 15. Within decobalter 15 soluble cobalt carbonyl is removed from the aldehyde prior to hydrogenation in order to prevent decomposition in the subsequent stages. Decobalting may be accomplished by one of several known means. These include thermal treatment comprising heating coils within decobalter 15 whereby cobalt metal is deposited on the coils. If desired, hydrogen gas may be admitted via line 16 to aid in the decomposition of cobalt carbonyl. Alternatively aqueous decobalting, e.g. with steam and/or water, at elevated temperatures may be employed or acid decobalting may be used, e.g. acetic, oxalic, etc. Carbon monoxide byproduct from the decomposition of cobalt carbonyl and any stripping gas present may be taken overhead via line 17. The decobalted product is then passed via line 18 to hydrogenator 19 and hydrogen gas passed through said zone via line 20. Any of the several known hydrogenation catalysts such as metallic nickel, cobalt and sulfactive catalysts such as the sulfides of molybdenum, zinc, tungsten and the like compounds, may be employed. The novelty of this invention relates primarily to the oxonation stage per se, the hydrogenation step being described merely to set forth a whole process culminating in the recovery of alcohols. Finally, the alcohol product is recovered overhead via line 21. The alcohol product of course may be further purified by distillation or other known means. Fractionating towers are not shown.

In Figure 2, which represents another modification of this invention, zone 22, which may comprise a tower, is placed downstream from the oxo reactor 2 and product effluent is passed through this tower containing solid contact material of the type described, prior to the subsequent stages. In this modification the dimer alcohol product is materially increased regardless of whether the effluent is recycled as shown in Figure 1. The temperature of the reactor effluent and the associated pressures will generally be sufficient to effect the desired chemical change in zone 22; however, heating means may be employed to maintain the temperatures and pressures in this zone at 250° to 350° F. and 500 to 3000 p.s.i.g. with residence time of 15 minutes to 12 hours.

In Figure 3, which is another embodiment of this invention, the additional zone 22 containing the solid contact material is also placed downstream from reactor 2, as shown in Figure 2, and a secondary reactor 23 similar to the primary reactor is employed downstream from zone or tower 22. Conditions within secondary reactor 23 are maintained within the ranges set forth for the primary reactor. From the secondary reactor 23 the reactor effluent will be taken overhead via line 24 and fed to the separator 7, all in the manner shown in Figure 1.

To illustrate applicants' invention reference is now had to the following examples:

EXAMPLE 1

To 1500 cc. of $C_7$ olefin feed were added 37 grams of cracking catalyst, 13% $Al_2O_3$–87% $SiO_2$, activated overnight (12 hours) at 1000° F., and 2.1 wt. percent cobalt oleate catalyst (0.2 wt. percent cobalt on feed). The mixture was oxonated six hours at 350° F. and 3000 p.s.i.g. with 1/1 $H_2$/CO synthesis gas ratio. The product was thermally decobalted at 350° F. with 800 p.s.i. $H_2$ and hydrogenated for six hours at 350° F. over Harshaw nickel catalyst using methanized $H_2$ gas at 3000 p.s.i.g. Distillation of hydrogenation product was carried out at 20 mm. pressure after filtering off catalyst.

EXAMPLE 2

This example was carried out identically to Example 1 with the exception that 75 grams of silica-alumina were employed.

The results are compared below in the following table with a conventional oxonation run:

Table I

|  | Conventional | Example 1 | Example 2 |
|---|---|---|---|
| Modifier | None (Control) | 3.5% Silica-alumina | 7.0% Silica-alumina |
| Distillation Data: Products, Wt. Percent— | | | |
| Hydrocarbon | 14.7 | 19.6 | 18.0 |
| Intermediate alcohols $C_8$–$C_{16}$ | 4.5 | 7.0 | 9.0 |
| Bottoms | 13.5 | 5.5 | 7.0 |
| $C_8$ Alcohol | 64.5 | 55 | 54 |
| Dimer Alcohols ($C_{16}$ and $C_{17}$) | 3.0 | 12 | 11 |
| Total Alcohols | 67.5 | 67 | 65 |

A significant increase in dimer alcohol yield was obtained employing small amounts of silica-alumina. It is also noted that an extremely low bottoms yields is obtained in both runs made in accordance with this invention.

To demonstrate the effectiveness of the present modifier as compared to other solid materials, kieselguhr and silica-magnesia were tested as set forth in the following examples:

EXAMPLE 3

To 1000 cc. of $C_7$ olefin feed were added 25 grams of kieselguhr (activated overnight at 1000° F.) and 2.1 wt. percent cobalt oleate catalyst (0.2 wt. percent cobalt on olefin feed). The oxonation, decobalting, hydrogenation and distillation procedure was the same as for Example 1.

EXAMPLE 4

A $C_7$ olefin feed was oxonated identically as Example 1 above.

EXAMPLE 5

A $C_7$ olefin feed was oxonated with the same conditions as set forth in Example 1 employing 1200 cc. olefin and 3.5 wt. percent of a silica-magnesia catalyst (70% $SiO_2$, 30% MgO) which was activated overnight at 1000° F. The decobalting and distillation techniques employed were the same for all examples.

*Table II*

| | Example 3 | Example 4 | Example 5 |
|---|---|---|---|
| Feed | $C_7$ olefin | | |
| Catalyst | Cobalt oleate | | |
| Modifier | 3.5 wt. % Kieselgunr | 3.5 wt. % Silica-alumina | 3.5 wt. % Silica-magnesia |
| Distillation Data: Products, Wt. Percent— | | | |
| Hydrocarbon | 17.0 | 19.6 | 20.1 |
| Intermediate | 3.8 | 7.0 | 3.9 |
| Bottoms | 8.1 | 5.5 | 4.8 |
| Dimer Alcohols ($C_{16}$ and $C_{17}$) | 6.6 | 12 | 4.1 |

The above data indicate that silica-alumina is far superior to other solid contacting agents as a modifier for the oxo reaction. It is noted that almost twice the yield of dimer alcohol was obtained with silica-alumina as compared to kieselguhr.

What is claimed is:

1. A process for producing an alcohol which comprises hydrogenating an aldehyde mixture obtained by carbonylating an olefinic compound with hydrogen and carbon monoxide in the presence of a carbonylation catalyst at an elevated temperature and pressure to produce an aldehyde-containing reaction mixture and by contacting said reaction mixture with a modifier consisting essentially of 10–90 wt. percent silica and 90–10 wt. percent alumina, said modifier being employed in an amount sufficient to produce upon said subsequent hydrogenation increased yields of dimer alcohol.

2. A process in accordance with claim 1 wherein said contacting is accomplished by employing an oxo reactor packed with activated silica-alumina so that contact is made during the reaction.

3. A process in accordance with claim 1 wherein the contacting is carried out by passing the reactor effluent from the oxonation zone through a zone downstream therefrom containing silica-alumina and recycling the contacted product to the oxo reactor.

4. A method in accordance with claim 1 wherein the contacting is carried out by passing the oxo reactor effluent through a zone containing silica-alumina and then feeding the thus contacted product to a second oxo reactor.

5. A method in accordance with claim 1 wherein said contacting is carried out by feeding to the oxo reactor the olefin feed containing in slurry form activated silica-alumina.

References Cited in the file of this patent

UNITED STATES PATENTS 2,562,980  Atwell _____ Aug. 7, 1951